(No Model.)

J. A. TRUE & E. SMITH.
CAR STARTER.

No. 290,720. Patented Dec. 25, 1883.

Attest;
Wm. H. Drury,
Fred J. Hutchinson.

Inventors;
John A. True,
Ebenezer Smith,
per Edw. Summer, Atty.

UNITED STATES PATENT OFFICE.

JOHN A. TRUE AND EBENEZER SMITH, OF NEWBURYPORT, MASS.

CAR-STARTER.

SPECIFICATION forming part of Letters Patent No. 290,720, dated December 25, 1883.

Application filed May 17, 1883. (No model.)

*To all whom it may concern:*

Be it known that we, JOHN A. TRUE and EBENEZER SMITH, citizens of the United States, residing at Newburyport, in the county of Essex and State of Massachusetts, have invented a new and useful Horse-Car Starter, of which the following is a specification, reference being had to the accompanying drawings.

Our invention relates to a device for starting horse-cars, the same also serving as a brake, said device utilizing the momentum of the car to wind up a spring which acts to stop the car, and, being allowed to uncoil, operates to start the car.

Our invention consists, primarily, in so adapting one or more spiral springs that, while stopping the car, both ends of each spring shall revolve in the same direction, but one end faster than the other, and thus the spring be wound up, so that in uncoiling it may act directly for starting the car, as hereinafter set forth; and it also consists in the several parts arranged and combined, as hereinafter specified, and specifically pointed out in the claims.

Figure 1:
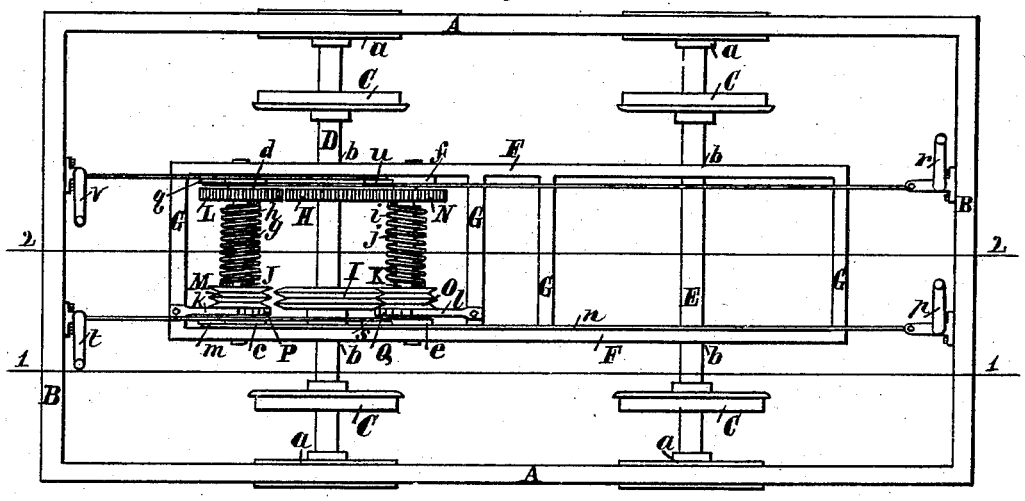
Figure 2:
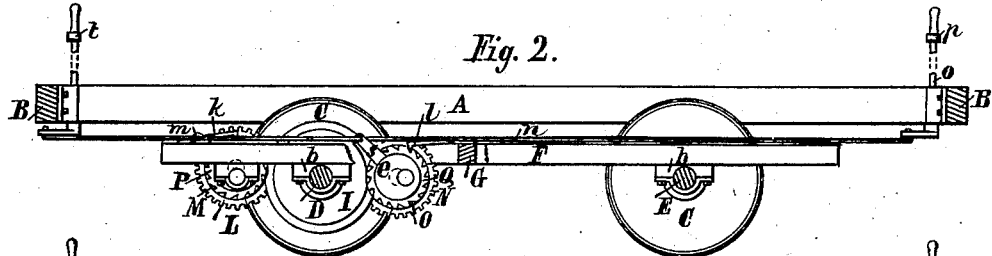
Figure 3:
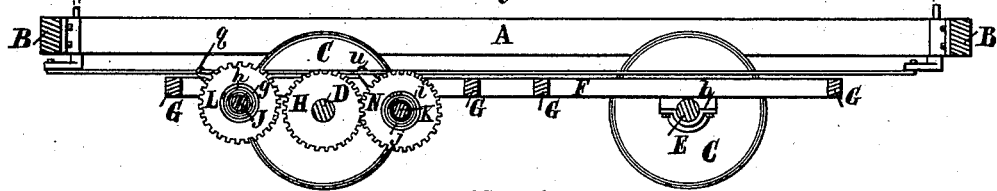
Figure 4:
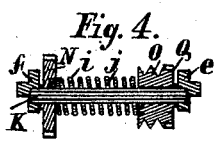

In the drawings, Figure 1 is a plan of so much of a car, and of our device connected therewith, as serves for illustration of our invention. Fig. 2 is a vertical section taken on line 1 1; and Fig. 3, a vertical section taken on line 2 2 in Fig. 1. Fig. 4 is a horizontal central section of parts on the shaft K.

The longitudinal sills A, transverse sills B, wheels C, axles D and E, to revolve in boxes at *a*, are those of any ordinary horse-car.

Supported by the axles D and E is a frame suitable for supporting the working parts of our device. This frame is here shown as consisting of the longitudinal rails F and transverse pieces G. Boxes at *b* form bearings for the axles.

On the axle D is a gear, H, and a friction-pulley, I, both fixed firmly on the axle. There are two shafts, J and K, parallel to the axle D, one on each side thereof. The ends of the shaft J are in eccentrics *c* and *d*, to revolve therein, and the ends of the shaft K in eccentrics *e* and *f*, to revolve therein. Each of these eccentrics has a bearing in a box fixed to a rail, F. On the shaft J is a gear, L, which may engage with the gear H, and a friction-pulley, M, which may be in contact with the pulley I. On the shaft K is a gear, N, to engage with the gear H, and a friction-pulley, O, to be driven by the pulley I. Each of the gears is fixed on its shaft. Each of the pulleys M and O is loose on its shaft, so that it may revolve thereon. Between the gear and the pulley on the shaft J are spiral springs *g* and *h*, and on the shaft K spiral springs *i* and *j*. One end of each spring is firmly connected to a gear on the shaft and the other end to one of the pulleys M O. The springs on one of the shafts are wound in the opposite direction from those on the other shaft. Instead of having one spring on each of the shafts J and K, we prefer to have two springs, one within the other, as shown. One spring, or more than two, might be used on each of these shafts.

To the pulley M is fixed a ratchet-wheel, P, and to the pulley O a ratchet-wheel, Q. On the frame is located a pawl, *k*, to engage with the ratchet-wheel P, and a pawl, *l*, to engage with the ratchet-wheel Q.

On the eccentric *c* is an arm, *m*, which is connected by means of a rod, *n*, to a vertical shaft, *o*, and hand-lever *p*, as shown. An arm, *q*, on the eccentric *d* is similarly connected to a hand-lever, *r*, an arm, *s*, on the eccentric *e* to a hand-lever, *t*, and an arm, *u*, on the eccentric *f* to a hand-lever, *v*.

Instead of the rod *n* and the other similar rods, chains might be employed, or other suitable contrivance, whereby the hand-levers may be located in the most convenient positions.

The gears and friction-pulleys are of such relative diameters that when they are in engagement either of pulleys M O is driven faster than the gear on the same shaft, and, hence, than the shaft itself.

In operation, when the car is going in one direction, the gear L is out of engagement with the gear H, and the pulley M away from contact with the pulley I, while the gear N is in engagement with the gear H, but the pulley O away from contact with the pulley I. On stopping the car, the pulley O is brought, by means of the eccentric at that end of its shaft, and the arm, rod, and hand-lever connected therewith, into contact with the pulley I. The pulley O thereupon revolves as well as the gear N, in the same direction of, but faster than this gear. Thus the springs *i* and *j* are wound up, and the tension of the springs acts to stop the car. A reverse movement of the pulley O is prevented by the pawl *l* and ratchet-wheel Q. When the gears H and N are in engagement and the pulleys I and O are in contact, the springs *i* and *j* cannot uncoil, the pulley O being held from making revolution in the reverse direction, as stated above. To start the car, the pulley O is thrown out of contact with the pulley I. The springs may then uncoil, and in doing so revolve the gear N, and in the same direction that it revolved while the springs were being wound up, and hence start the car in the same direction that it was traveling before being stopped by means of these springs. When the car is to travel in the opposite direction, the gear N is thrown out of engagement with the gear H, as also the pulley O out of contact with the pulley I, and the gear L is thrown into engagement with the gear H. Stopping and starting the car is then done by means of the springs *h* and *g*, pulley M, ratchet-wheel P, pawl *k*, eccentric, and other parts connected therewith, in a manner similar to that particularly specified of the mechanism on the shaft K. The manner of operating the eccentrics by means of their arms and the rods and hand-levers connected therewith will be readily understood without further explanation in detail.

We have shown the gears H, L, and N as of the same size, and each of the pulleys M O one-half the pitch diameter of the pulley I. These proportions may, however, be varied from, provided this result be obtained—namely, that one end of each spring, or set of springs, be revolved in the same direction, but faster than the other end, to wind up the spring or springs. Instead of the friction-wheels, gears might be employed; but we prefer the friction-wheels, since the springs may thus be prevented from being overstrained and the tension thereof be regulated. The friction-wheels may slip, one on the other, when the tension of the springs is as great as is necessary, or as they will bear. Instead of the springs formed as shown, they may be wound, each upon itself, like watch-springs.

We intend to have, in connection with the other axle, E, a system of gears, friction-pulleys, springs, &c., similar to that above described, the eccentrics thereof being adapted to be operated by the same hand-levers which are used for the arrangement shown in connection with the axle D, by suitably extending and attaching the rods shown thereto.

We claim as our invention—

1. In a car-starter, the combination of these elements, namely, a car-axle, a spiral spring, and means, operated by said axle, for causing both ends of said spring to revolve in the same direction, but one of said ends faster than the other, substantially as and for the purpose set forth.

2. The combination of a car-axle, D, gear H, friction-pulley I, gear N, friction-pulley O, shaft K, and one or more springs on said shaft, substantially as specified.

3. The combination of the axle D, gears H and N, friction-pulleys I and O, shaft K, bearing one or more spiral springs, and eccentrics *e* and *f*, substantially as specified.

4. In a car-starter, the combination of one or more spiral springs, *i j*, gear N, friction-pulley O, or a gear, ratchet-wheel Q, pawl *l*, and a gear and friction-pulley, or two gears, on the axle, substantially as set forth.

5. The combination of axle D, gear H, gear N, friction-pulleys I and O, shaft K, one or more spiral springs, *i j*, eccentrics *e f*, ratchet-wheel Q, and pawl *l*, substantially as described.

6. In a car-starter, the combination of these elements, namely, a spiral spring, both ends of which are so geared to an axle of the car that they may be revolved in the same direction by means of said axle, but one end revolved faster than the other end, a ratchet-wheel fixed to one end of the spring, a pawl to engage with said ratchet-wheel, a shaft on which said ratchet-wheel may revolve, and to which the other end of the spring is fixed, and said axle, substantially as and for the purpose set forth.

JOHN A. TRUE.
EBENEZER SMITH.

Witnesses:
GEO. W. AUSTIN,
WM. S. DODGE.